3,845,132
FRAGRANT POLYCYCLIC KETONES
Günther Ohloff, Bernex, Geneva, and Hugo Strickler, La Plaine, Geneva, Switzerland, assignors to Firmenich S.A., Geneva, Switzerland
No Drawing. Filed Mar. 7, 1969, Ser. No. 805,353
Claims priority, application Switzerland, Mar. 8, 1968, 3,506/68; Mar. 4, 1969, 3,232/69
Int. Cl. C07c 49/36
U.S. Cl. 260—586 R       3 Claims

ABSTRACT OF THE DISCLOSURE

3-Thuyopsanone and its stereo isomers (—)-3-thuyopsanone and (—) - 3 - isothuyopsanone are prepared by oxidation of the sesquiterpene hydrocarbon thuyopsene (or its stereo isomers), or by oxidation, thermal rearrangement, saponification or acid conversion of novel intermediates derived from said hydrocarbon. The tricyclic ketones thus prepared have odoriferous properties which can be used to advantage in perfumes and perfumed products such as cosmetics, soaps, detergents, and the like.

The present invention relates to new fragrant tricyclic ketones of general formula

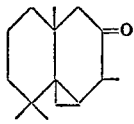

I and to new odoriferous compositions comprising them. Formula I represents a ketone called thuyopsanone which because of its asymmetry centers comprises several odoriferous configuration isomers.

The invention also relates to methods for preparing some of said isomers and to intermediates used in said methods.

Isomeric ketones having general formula I have been found to possess very interesting odoriferous properties and are therefore useful in the perfume industry. They can be used with advantage in the preparation of perfumes and perfumed products, e.g. cosmetics, soaps, detergents and the like. Furthermore, contrary to many other odoriferous substances they are remarkably stable toward bases so that they can be used advantageously to perfume alkaline soaps and bleaching powders.

Compounds I impart to the compositions to which they have been added a very natural and harmonious woody fragrance. In certain cases the addition of compounds I to odoriferous compositions results in the development of a fragrance characterised by its freshness and cleanliness. The proportions in which the new compounds may be added to produce the desired fragrance vary between wide limits and depend on the type of perfumed product and on the effect sought. In some cases very small amounts, for example of the order of 10 to 500 p.p.m. by weight of the total of the product are enough to produce interesting results. In other cases, amounts of 0.001 to 10% by weight of perfume composition constitute a useful range. In further cases, particularly when dealing with unfinished products such as modifiers or concentrates which serve as basic ingredients for the preparation of perfume compositions, higher concentrations of the new compounds may be desirable, for instance up to 15% or more.

The concentration ranges given above should not be deemed as limiting. Thus in some special cases where rather peculiar effects are sought, concentrations falling outside the ranges mentioned hereinbefore may be necessary. Specific examples described hereinafter will illustrate the utilisation of the new fragrant compounds.

According to the invention, some of the configuration isomers comprised by formula I can be prepared by the oxidation, by means of an oxidant, of thuyopsene, a sesquiterpene hydrocarbon, either synthetic or natural having the general formula

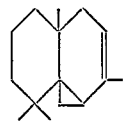

Thuyopsene possesses two asymmetry centers and can have therefore 4 optically active isomeric configurations (2 diastereomeric pairs). Each one of these configurational isomers can be used as a starting material in the process of the invention and each one leads to the formation of different configurational isomers of thuyopsanone I. Thus, using optically active natural thuyopsene, extracted from the oil of certain conifers [see for instance J. Am. Chem. Soc. 86, 2884 (1964); Acta Chim. Scand. 17, 738 (1963)] results in the formation of the following thuyopsanone isomers:

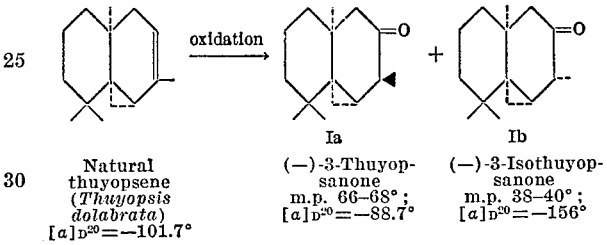

| Natural thuyopsene (Thuyopsis dolabrata) $[\alpha]_D^{20} = -101.7°$ | (—)-3-Thuyopsanone m.p. 66–68°; $[\alpha]_D^{20} = -88.7°$ | (—)-3-Isothuyopsanone m.p. 38–40°; $[\alpha]_D^{20} = -156°$ |

Thuyopsene can be oxidised with oxidants such as for instance (a) peracids, e.g. peracetic acid, performic acid, perbenzoic acid, m-chloroperbenzoic acid and monoperphthalic acid or (b) oxidised derivatives of transition elements such as chromium or manganese, for instance chromyl chloride, tert.-butyl chromate, manganese dioxide or potassium permanganate. Peracetic acid and chromyl chloride represent preferred kinds of oxidants. Thuyopsene can also be oxidised to thuyopsanone by means of (c) a gaseous stream consisting in part or entirely of oxygen, in the presence of actinic radiations and in the presence of an energy-transfer sensitiser. When using this type of oxidant and thuyopsene as a starting material, a new intermediate of formula

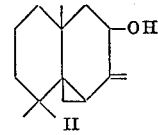

II $\Delta^{2(12)}$-thuyopsen-3-ol is first formed, which is subsequently isomerised with an acid to thuyopsanone.

The conditions under which the oxidation of thuyopsene can be carried out depend upon the nature of the oxidant selected. Thus, when using a peracid, the oxidation can be performed in an organic solvent such as for instance an organic acid, a chlorinated solvent, e.g. chloroform or methylene chloride, an ester such as ethyl acetate and a hydrocarbon such as xylene or toluene. The oxidation can be carried out at temperatures comprised approximately between —60° and +80° C. but, for practical reasons, preferably comprised between 0 and 50° C. It is advantageous but not critical to first strongly cool the solution to be oxidised and add the peracid at such a rate that the heat of reaction maintains the temperature between approximately 20 and 40° C. The temperatures indicated herein should not be considered as absolute limits. However, operating outside of these limits may cause lower yields or reaction control difficulties. The peracid used according to the above modus procedure can also be generated in situ by adding H₂O₂ to the reaction mixture, the solvent for the latter consisting partly or entirely of the acid or anhydride precursors of said peracid. Thus, the organic acid solvent or solvent component can be for instance acetic acid, acetic anhydride or formic acid.

After the oxidation of thuyopsene by a peracid is completed, the resulting thuyopsanone can be isolated via different routes. For instance:

(1) The mixture can be distilled to eliminate the volatile solvents and the acid derived from the peracid used in the oxidation, then the residue is fractionated according to usual means to isolate the thuyopsanone, or (2) The reaction mixture may be allowed to crystallise whereupon a solid of formula

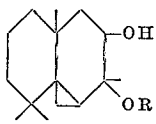

wherein R is an acyl group derived from the peracid used in the oxidation, can be isolated. This solid when heated leads to a mixture of thuyopsanone and alcohol of formula II. According to the invention, the latter is isomerised with an acid to thuyopsanone as described hereinafter in more detail; or (3) The above solid glycol monoacylate can be saponified to the corresponding glycol, the latter being also subsequently isomerised to thuyopsanone with an acid as mentioned above.

When oxidising thuyopsene with for instance chromyl chloride, the former is dissolved in a solvent such as a chlorinated solvent, e.g. carbon tetrachloride or trichlorethylene, or an inert solvent such as cyclohexane or petroleum ether, and the oxidation is carried out at a temperature comprised for instance between 0 and 50° C. but preferably between 10 and 20° C. for easier control. This results in the formation of a voluminous precipitate, the nature of which has not been entirely determined (possibly a complex of the oxidation product and solvent) and which is preferably treated with aqueous sodium bisulphite in order to effect the separation of the desired ketone formed by the oxidation.

When performing the oxidation of thuyopsene by means of oxygen, a stream of this gas, either pure or in admixture with other gases such as for instance nitrogen, helium or carbon dioxide, is bubbled into a solution of thuyopsene and a catalytic amount of an energy transfer sensitiser in an organic solvent such as an alcohol e.g. methanol, ethanol, propanol, isopropanol and butanol, or a hydrocarbon e.g. benzene, xylene and toluene, or an ester e.g. ethyl acetate, ethyl propionate, butyl acetate and the like, or mixtures of at least two of the above said solvents at temperatures comprised between —20 and 50° C., preferably at room temperature, and under continuous irradiation.

Conventional mercury or sodium vapour arcs can be used as sources of actinic radiations for irradiation purposes. As energy transfer sensitisers, most current sensitisers such as eosine, porphyrines, chlorophyll or Rose-Bengale can be used. For economic reasons, Rose-Bengale is preferred. After the take up of oxygen is completed the reaction mixture is treated with a common reducing agent in order to break down the peroxides formed during the oxidation and to permit isolating intermediate II. Most ordinary reducing agents such as for instance sulphites, alkali borohydrides and trialkyl- or triaryl phosphines can be used. Sodium sulphite and triphenylphosphine are preferably used. When carrying out this type of oxidation of natural thuyopsene the intermediate II isolated has the following structure

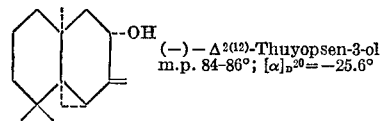

IIa

Strong acids such as for instance hydrogen chloride, sulphuric acid, phosphoric acid and perchloric acid can be used to isomerise the hydroxy derivative IIa into ketones Ia and Ib. For convenience sulphuric acid is preferred.

The thuyopsanone which results from carrying out the oxidation process described hereinbefore with natural thuyopsene can be separated into its configurational isomers (—)-3-thuyopsanone Ia and (—)-3-isothuyopsanone Ib by conventional means, for instance preparative vapour phase chromatography or fractional distillation followed by crystallisation of the resulting fractions of distillation. Ia and Ib can be used together or independently in the perfume industry. Since their olfactive properties are closely related it is generally more economical to use mixtures of Ia and Ib.

According to another process of the invention, (—)-3-thuyopsanone Ia and (—)-3-isothuyopsanone Ib, respectively, are produced by the oxidation, by means of an oxidant, of the corresponding new alcohols IIIa and IIIb respectively having the formulae

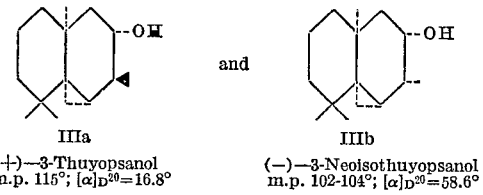

The oxidation of a mixture of alcohols IIIa and IIIb furnishes a mixture of the corresponding (—)-3-thuyopsanone and (—)-3-isothuyopsanone Ia and Ib.

The oxidation can be carried out by means of oxidants which are known to stereo-selectively oxidise secondary alcohols to the corresponding ketones. Thus, for instance, CrO₃ can be used advantageously for the above oxidation especially using a two-phase water-ether medium.

The starting materials used in this process of the invention can be prepared from thuyopsene according to known methods. Thus, for instance, natural thuyopsene can be hydroborated [see for example H. C. Brown, Hydroboration, Benjamin Inc., New York (1962)]; then the hydroboration product can be oxidised by means of alkaline H₂O₂. This reaction which results in the formation of IIIa is illustrated below

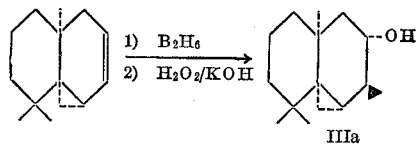

A mixture of isomeric alcohols IIIa and IIIb can be obtained by catalytic hydrogenation of alcohol IIa, following usual procedures. This reaction is illustrated below

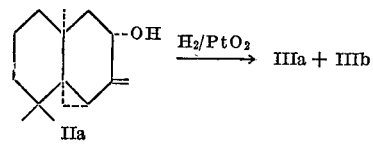

Alcohols IIIa and IIIb can then be separated from each other by usual means, e.g. distillation on a spinning band column or preparative vapour phase chromatography.

In the following Examples which illustrate the invention in a more detailed manner, the temperatures are given in degrees centigrade.

EXAMPLE 1

Preparation of a perfume extract

A perfume extract was prepared by mixing the following ingredients

| Ingredients: | Parts by weight |
|---|---|
| Jasmine absolute | 5 |
| Rose of May absolute | 5 |
| Coumarin | 10 |
| Methylnonylacetaldehyde at 10%* | 10 |
| Undecanal at 10%* | 40 |
| Methylphenylcarbinyl acetate | 40 |
| γ-Undecalactone at 10%* | 20 |
| Exaltone at 10%* | 20 |
| Oliban oil | 10 |
| Oak moss absolute | 10 |
| Musk ketone | 20 |
| Musk ambrette | 20 |
| Oil of labdanum | 20 |
| Civet degreased, at 10%* | 50 |
| Isobutyl salicylate | 40 |
| Vetiveryl acetate | 60 |
| Hydroxycitronellal | 80 |
| α-Amyl-cinnamaldehyde | 40 |
| Bergamot | 100 |
| Jasmine synthetic | 100 |
| Rose synthetic | 100 |
| α-Isomethylionone | 100 |
| Total | 900 |

*In diethyl phthalate.

When 10 g. of the mixture of (—)-3-thuyopsanone and (—)-3-isothuyopsanone prepared according to Example 4 were added to 90 g. of the above mixture, the latter developed a very natural and harmonious fragrant note of woody nature.

EXAMPLE 2

Preparation of a soap perfume

A soap perfume was prepared by mixing the following ingredients

| Ingredients: | Parts by weight |
|---|---|
| Geranium bourbon oil | 30 |
| Clove oil | 50 |
| Trichloromethylphenyl acetate | 40 |
| Musk xylene | 50 |
| Coumarin | 50 |
| Benzyl acetate | 70 |
| Phenylethyl alcohol | 70 |
| Bergamot | 80 |
| Amyl salicylate | 80 |
| Linalyl acetate | 80 |
| Terpineol | 100 |
| Geraniol | 100 |
| Lavandin oil | 100 |
| Total | 900 |

When 10 g. of the mixture of ketones Ia and Ib as prepared according to Example 4 were added to 90 g. of the above mixture, they imparted to the latter a very natural and harmonious woody note.

EXAMPLE 3

Preparation of a cosmetic perfume composition

A perfume composition for cosmetic use was prepared by mixing together the following ingredients

| Ingredients: | Parts by weight |
|---|---|
| Undecanal at 10%* | 15 |
| Decanal at 10%* | 20 |
| Dodecanal at 10%* | 5 |
| Dimethylacetyl-tert.-butylindane | 20 |
| Indole at 10%* | 10 |
| Hydroxycitronellal | 30 |
| Neroli bigarade | 10 |
| Linalyl acetate | 30 |
| Linalool | 70 |
| Citronellyl acetate | 20 |
| Citronellol | 100 |
| Rose oxide at 10%* | 10 |
| Piperonal | 50 |
| Styrax oil | 20 |
| Cinnamyl alcohol | 10 |
| Phenylethyl alcohol | 120 |
| α-Isomethylionone | 80 |
| Ylang | 50 |
| Isoeugenol | 40 |
| Eugenol | 30 |
| Hexylcinnamaldehyde | 60 |
| Benzyl acetate | 120 |
| Thuyopsenal | 40 |
| Total | 960 |

*In diethyl phthalate.

The addition of 40 g. of ketone Ia to 960 g. of the above composition resulted in a perfume composition for cosmetics possessing a very fresh and clean note.

EXAMPLE 4

Preparation of the mixture of ketones Ia and Ib

Thuyopsene (20.4 g.) prepared by the distillation of Hiba-Wood oil, sodium acetate (10.2 g.) and methylene chloride (50 ml.) were stirred for 1 hour at room temperature. To the mixture cooled down to —20° to —10° 42% peracetic acid (21 g.) was added dropwise in the course of 15 minutes. During the addition the temperature was maintained between 0 and 10°. After standing overnight at room temperature, the mixture was filtered and poured into ice-water. The organic layer was separated, neutralised with concentrated aqueous $Na_2CO_3$, dried and then distilled. The mixture of ketones Ia and Ib, b.p. 96–99°/0.15 torr, was obtained in 70% yield. It gave the following constants: $n_D^{20}=1.5029$; $d_4^{20}=1.002$; $[\alpha]_D^{20}=-115.7°$.

*Analysis.*—Calculated for $C_{15}H_{24}O$: C, 81.76%; H, 10.98. Found: C, 81.14%; H, 10.74%.

Comparable results were obtained when peracetic acid was replaced, in the present Example, by other peracids such as perbenzoic or m-chloroperbenzoic acids, dissolved in methylene chloride.

EXAMPLE 5

Preparation of the mixture of ketones Ia and Ib

To thuyopsene (20.4 g., 0.1 mole) in $CCl_4$ (20 ml.) a solution of $CrO_2Cl_2$ (31 g., 0.2 mole) in $CCl_4$ (130 ml.) was added dropwise, in the course of 45 minutes, with vigorous stirring and cooling. During the addition, which resulted in the formation of a voluminous precipitate, the temperature was maintained between 13 and 20° C. After stirring overnight at room temperature, the precipitate was separated by suction-filtration and was added to an excess of an aqueous sodium bisulphite solution. The crude ketone was extracted twice with ether and the extracts were washed with the following fractions: water (twice); 10% aqueous $NaHCO_3$ (twice); water (twice). After the usual purification procedure, the purified ketone mixture (7.8 g., 35.4%), b.p. 95–99°/0.15 torr, was obtained. Analysis, refraction and density were identical to those indicated in Example 4; $[\alpha]_D^{20}$ was —77.3°.

EXAMPLE 6

Preparation of the mixture of ketones Ia and Ib (a) Hydroxyl compound II.—A solution of thuyopsene (612 g., 3 mole) and Rose-Bengale (20–50 mg.) in methanol (2 litres) was irradiated with a 200 W sodium vapour lamp, while a stream of oxygen was introduced into the mixture. After 18 hours, 70 litres of oxygen had been consumed and the oxidation reaction was stopped. A solution of sodium sulphite (415 g., 3.3 mole) in 2 litres of water was added with stirring to the mixture, the temperature being kept below 60° C. The organic layer was separated and the aqueous phase was extracted twice with ether. The main layer and the two extracts were mixed, washed with water and after the usual procedure, 203.3 g. of hydroxyl compound II, b.p. 96°/0.02 torr, were isolated by distillation. Yield 30.8%. The product was crystallised twice from petroleum-ether, m.p. 84–85°. $[\alpha]_D^{20}$ (10% solution in $CHCl_3$) = —19.0°.

*Analysis.*—Calculated for $C_{15}H_{24}O$: C, 81.76%; H, 10.98%. Found: C, 81.64%; H, 11.04%.

(b) Isomerisation of compound II.—100 g. of the alcohol II, prepared according to the method of the previous paragraph, were stirred vigorously for 4 hours with 5 ml. of 10% aqueous $H_2SO_4$ in 100 ml. of benzene. The benzene solution was separated, neutralised with anhydrous $K_2CO_3$ and concentrated under vacuum. Distillation of the residue gave the mixture of ketones Ia and Ib practically quantitatively; b.p. 99–100°/0.2 torr; $[\alpha]_D^{20}$ = —147°. The other analytical results were identical to those recorded in Example 4.

EXAMPLE 7

Preparation of (—)-3-thuyopsanone Ia and (—)-3-isothuyopsanone Ib

A mixture of thuyopsene (20.4 g., 0.1 mole) prepared by the distillation of Hiba Wood oil [*Thuyopsis dolabrata*], sodium acetate (2 g.) and ethyl acetate (50 ml.) was stirred with cooling. A 42% peracetic acid solution (21 g.) was added dropwise, the temperature being maintained below 60° by means of refrigeration.

Then the solution was poured into ice-water and the organic phase separated. The latter was washed with water and neutralised with $Na_2CO_3$. After drying, the solvents were removed by distillation under reduced pressure whereupon the residue was heated in order to remove the greater portion of the combined acetic acid. After distillation of the residue there were obtained 12.6 g. (57.2%) of a mixture, b.p. 80°/0.001 torr, containing 17.5% of thuyopsanone, m.p. 68°, and 82.5% of isothuyopsanone, m.p. 40°. This composition was established by gas chromatographic analysis. By repeated crystallization of the product in petroleum ether (boiling range 30–50°) pure isothuyopsanone, m.p. 38–40°; $[\alpha]_D^{20}$ = —156° ($CCl_4$), was obtained.

*Analysis.*—Calculated for $C_{15}H_{24}O$: C, 81.76%; H, 10.98%. Found: C, 81.93%; H, 10.87%.

U.V. spectrum (ethanol): 2020 A. ($\epsilon$=353.8), 2870 A. ($\epsilon$=23.3). NMR spectrum (Varian HA-100): 0.64 (3H, s.), 1.1 (3H, d., J=0.7 cps.), 1.1 and 1.2 (2 x 3H, s.), 0.2–0.6 (2H, broad band), 1.2–1.8 (7H), 2.05–2.2 (2H, d., J=1.6 cps.), 2.45–2.75 (1H, broad band) p.p.m. δ.

From the mother-liquors of the above crystallisation the other isomer, thuyopsanone, was isolated. It was purified by repeated crystallisation in petroleum ether (boiling range 60–80°) and had a m.p. of 66–68°; $[\alpha]_D^{20}$ = —88.7 ($CCl_4$).

*Analysis.*—Calculated for $C_{15}H_{24}O$: C, 81.76%; H, 10.98%. Found: C, 81.79%; H, 10.88%.

U.S. spectrum (ethanol): 2010 A. ($\epsilon$=339.9), 2830 A. ($\epsilon$=28.5). NMR spectrum (Varian HA-100): 0.64 (3H s.), 1.2 (3H, d., J=0.7 cps.), 1.1 and 1.2 (2 x 3H, s.), 0.6–0.8 (2H, broad band), 1.3–1.9 (7H), 2.1–2.3 (2H, d., J=1.5 cps.), 2.3–2.55 (1H, broad band) p.p.m. δ.

EXAMPLE 8

Preparation of (—)-3-thuyopsanone and of (—)-3-isothuyopsanone (a) (—)-$\Delta^{2(12)}$-thuyopsen-3-ol. 102 g. of natural thuyopsene (0.5 mole) were dissolved in 2 litres of methanol. Then a spatula point of Rose Bengale, dissolved in 5 ml. of 5% aqueous $Na_2CO_3$, was added to the solution. An oxygen current was passed into the mixture at 20° under irradiation. After 7½ hours 10.6 litres of $O_2$ had been absorbed (85%). To the mixture cooled with ice was added dropwise a solution of 131.5 g. (0.5 mole) of triphenylphosphine in 350 ml. of ether. Stirring was continued until complete disappearance of the peroxides. After concentration in vacuo $Ph_3PO$ was removed by filtration, the filtrate was diluted with water and then extracted 3 times with ether. The extracts were treated as usual, and after separation of 3.4 g. of (—)-$\Delta^3$-thuyopsen-2-ol together with a small amount of residual $Ph_3PO$, subjected to a fractional distillation. The fractions distilling at 80–110°/0.001 torr were collected. These fractions were subjected to a series of fractional crystallisations from petroleum ether, b.p. 30–50° Thus, using the first fraction of distillation (—)-$\Delta^3$-thuyopsen-2-ol, m.p. 110–112° was isolated, while (—)-$\Delta^{2(12)}$-thuyopsen-3-ol, m.p. 84–86°, was isolated from the last fraction of distillation. These compounds were found to be in a ratio of 1:2 by weight.

*Analysis.*—Calculated for $C_{15}H_{24}O$: C, 81.76; H, 10.98%. Found (secondary thuyopsenol): C, 81.64%; H, 11.04%.

$[\alpha]_D^{20}$ = —25.6° ($CHCl_3$). NMR spectrum: 0.60 (3H, s.), 1.13 and 1.04 (2 x 3H, s.), 0.18–0.75 (2H, broad band), 1.2–2.2 (9H), 4.08 (1H, broad band), 5.0 (2H, d., J=0.9 cps.) p.p.m. δ.

(b) (+)-3-thuyopsanol and (—)-3-neoisothuyopsanol.—0.85 g. of (—)-$\Delta^{2(12)}$-thuyopsen-3-ol, prepared according to the procedure described in paragraph (a), were dissolved in 10 ml. of ethyl acetate. After the addition of 0.09 g. of $PtO_2$ the solution was hydrogenated as usual. After 1 hour the solution was filtered, the solvent was eliminated in vacuo and 0.75 g. of substance was collected. Gas-chromatographic analysis showed the presence of a constituent A (45%) and of a constituent B (35%) beside the presence of unidentified impurities.

Constituent A was separated by preparative vapour phase chromatogrphy and identified to be (+)-thuyopsan-3-ol, m.p. 115°. NMR spectrum: 0.53 (3H, s.), 1.1 (3H, d., J=0.4 cps.), 1.08 and 1.0 (2 x 3H, s.), 0.1–0.8 (2H broad band), 1.2–2.2 (11H), 3.15 (1H); then constituent B was identified to be (—)-neoisothuyopsan-3-ol, m.p. 102–104°. $[\alpha]_D^{20}$ = —16.8°.

(c) (+)-3-thuyopsanol.—Under an atmosphere of argon, at 15°, the diborane produced by the reaction of $NaBH_4$ (100 g.) in 1 litre of diglyme with boron trifluoride etherate (400 g.) was introduced into a solution of thuyopsene (105 g. $[\alpha]_D^{20}$ = —90°) in dry tetrahydrofuran (250 ml.). The reaction mixture was allowed to stand overnight then the excess of $B_2H_6$ was decomposed with a little water.

A solution of 30% $H_2O_2$ (30 g.) and 12% aqueous KOH (60 g.) was added dropwise at room temperature. After 2 days at room temperature, the mixture was extracted with petroleum ether (b.p. 30–50°). The extract was treated as usual and gave, after distillation under reduced pressure, 64 g. of crude 3-thuyopsanol. An analytical sample was obtained by crystallisation from petroleum ether (b.p. 80–100°) m.p. 113–114°; $[\alpha]_D$ = +16° ($CHCl_3$).

The spectral data were similar to those described under paragraph (b) above.

(d) Oxidation of (+)-3-thuyopsanol and (−)-3-neoisothuyopsanol (analogy with J. Am. Chem. Soc. *83*, 2952 (1961)).—(+)-3-Thuyopsanol, m.p. 115° (0.3 g.) prepared according to the methods described under paragraph (b) or (c) was dissolved in the minimum amount of ether; at 25°, this solution was added dropwise to a solution of sodium bichromate dihydrate (0.135 g.), $H_2SO_4$ (0.1 ml.) and water (2 ml.). After stirring 2 hours at 25°, the mixture was extracted with ether and, after the usual treatment, the crude product was fractionated with a spinning band column to give 66% of (−)-3-thuyopsanone. The analytical data were the same as these described in Example 7.

When in the above Example (−)-3-thuyopsanol was replaced by (+)-3-neoisothuyopsanol, (−)-3-isothuyopsanone was obtained in comparable yields.

EXAMPLE 9

Preparation of (−)-3-thuyopsanone and (−)-3-isothuyopsanone (a) Glycol monoacetate of formula

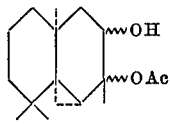

39.5% Peracetic acid (4210 g.) was added dropwise between 18 and 35° to a stirred mixture of natural thuyopsene (3565 g.), toluene (10 l.) and anhydrous sodium acetate (350 g.). During the addition the reaction temperature was controlled by means of a cooling bath. The reaction mixture was washed until neutral and concentrated. The residue was left overnight at 0°. The solid which separated (1880 g.) was removed by suction and the mother-liquors were treated as described in Example 7 to give a first fraction of thuyopsanone isomers.

The solid monoacetate was crystallised in petroleum ether (b.p. 50–70°), m.p. 108–109°. NMR spectrum ($CCl_4$): 0.54 (3H, s.), 1.0 (3H, s.), 1.1 (3H, s.), 1.3 (3H, s.), 2.0 (3H, s.), 4.62 (1H, d. of d., J=4 and 12 cps.) p.p.m. δ.

(b) Decomposition of the glycol-monoacetate by heat.—100 g. of the glycol monoacetate prepared according to the description of paragraph (a) above were subjected to two successive distillations between 145 and 160°. The titration of the distillate showed that all the combined acetic acid had been removed. The distillate was washed until neutral then it was shown, by vapour phase chromatography to be an approximately 1:1 mixture of thuyopsanone (2 isomers) and alcohol of formula IIa. This mixture was used as such in the next step. The yield was nearly 100%.

(c) Isomerization of the IIa component.—The mixture of thuyopsanone isomers and alcohol IIa (130 g.) prepared according to paragraph b) was dissolved in 150 ml. of ethanol. 50% $H_2SO_4$ (50 ml.) were added dropwise and the solution was kept 4 hours at 40°. In case of turbidity a few ml. of ethanol were added to clarify the solution. The mixture was diluted with water and extracted with petroleum ether (b.p. 50–70°). The extract was treated as usual and gave after distillation 120 g. of practically pure thuyopsanone. The ketone comprised an approximately 1:1 mixture of (−)-3-thuyopsanone and (−)-3-isothuyopsanone which were separated by usual means (see Example 7).

EXAMPLE 10

Preparation of (−)-3-isothuyopsanone (a) Saponification of the glycol-monoacetate of formula

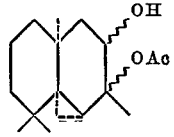

10 g. of the glycol-monoacetate prepared according to Example 9, paragraph (a) were reacted for 2½ hours with 15% KOH (16 g.). The mixture was extracted with petroleum ether and after the usual treatment the extract gave 8.2 g. of the crystallised glycol of formula

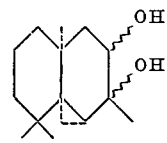

The glycol was recrystallised in petroleum ether (b.p. 30–50°), m.p. 78–80°. NMR spectrum ($CCl_4$): 0.55 (3H, s.), 1.0 (3H, s.), 1.36 (3H, s.), 3.0–3.5 (3H, complex band); this spectrum indicated the probable presence of at least 2 configurations.

(b) Treatment of the glycol with acid.—A solution of the glycol (10 g.) prepared according to the description of paragraph (a), 10% $H_2SO_4$ (5 ml.) and 50 ml. of petroleum ether (b.p. 80–100°) was boiled and stirred for 2 hours. The solution was neutralised and treated as usual to give 9 g. of 90% pure (−)-3-isothuyopsanone. The 10% impurity consisted of (−)-3-thuyopsanone as shown by vapour phase chromatography.

We claim:

1. A composition of matter of the formula

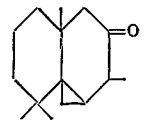

2. The composition of matter according to claim 1 wherein the ketone is (−)-3-thuyopsanone of formula

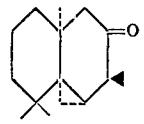

3. The composition of matter according to claim 1 wherein the ketone is (−)-3-isothuyopsanone of formula

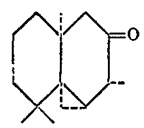

References Cited

UNITED STATES PATENTS 3,057,915   10/1962   Riemenschneider et al.
                                                260—586 B X
3,122,586   2/1964    Berndt et al. _____ 260—586 B
3,144,465   8/1964    Ruzicka et al. _____ 260—587 X

OTHER REFERENCES

Ito et al.: "Chemical Abstracts," vol. 64, pp. 5142–3, 1966.

Nozoe et al.: "Chemical Abstracts," vol. 55, pp. 22,362–3, 1961.

Nagahama et al.: "Chemical Abstracts," vol. 57, pp. 11,242–3, 1962.

Moller, "Chemistry of Organic Compounds," 3rd ed., p. 201, 1965.

Buchi et al.: "J.A.C.S.," vol. 86, pp. 2884–8 (1964).

LEON ZITVER, Primary Examiner

N. MORGENSTERN, Assistant Examiner

U.S. Cl. X.R.

252—522; 260—489, 631.5, 675.5, 586 P

UNITED STATES PATENT OFFICE
CERTIFICATE OF CORRECTION

Patent No. 3,845,132          Dated October 29, 1974

Inventor(s) Gunther Ohloff and Hugo Strickler

It is certified that error appears in the above-identified patent and that said Letters Patent are hereby corrected as shown below:

1. Column 7, line 74 reads "U.S. spectrum..." should read --U.V.--.

2. Column 8, line 51 reads "chromatogrphy" should read --chromatography--.

line 72 reads "$[\alpha]D = +16°$" should read --$[\alpha]D^{20} = +16°$--.

Signed and sealed this 4th day of February 1975.

(SEAL)
Attest:

McCOY M. GIBSON JR.        C. MARSHALL DANN
Attesting Officer         Commissioner of Patents